C. E. P. JULIEN.
ROTARY DRILLING OR SOWING MACHINE.
APPLICATION FILED DEC. 27, 1917.
1,304,321.
Patented May 20, 1919.
2 SHEETS—SHEET 1.
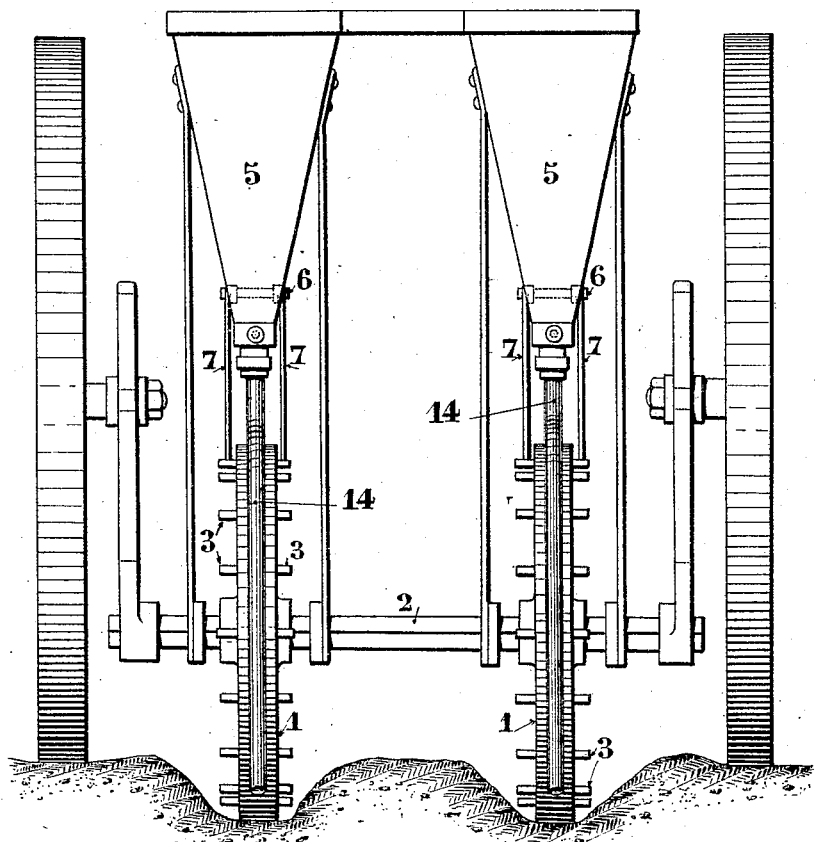
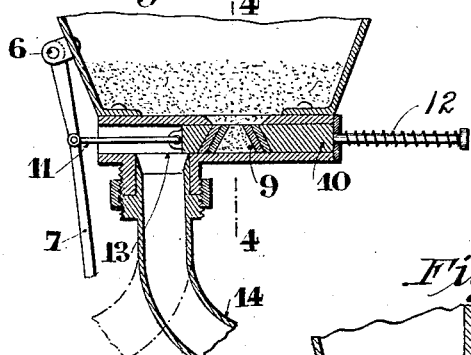
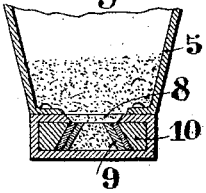
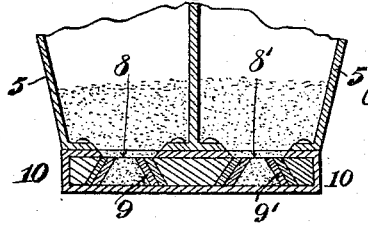
INVENTOR
Cyprien Edouard Paul Julien
BY
ATTORNEYS

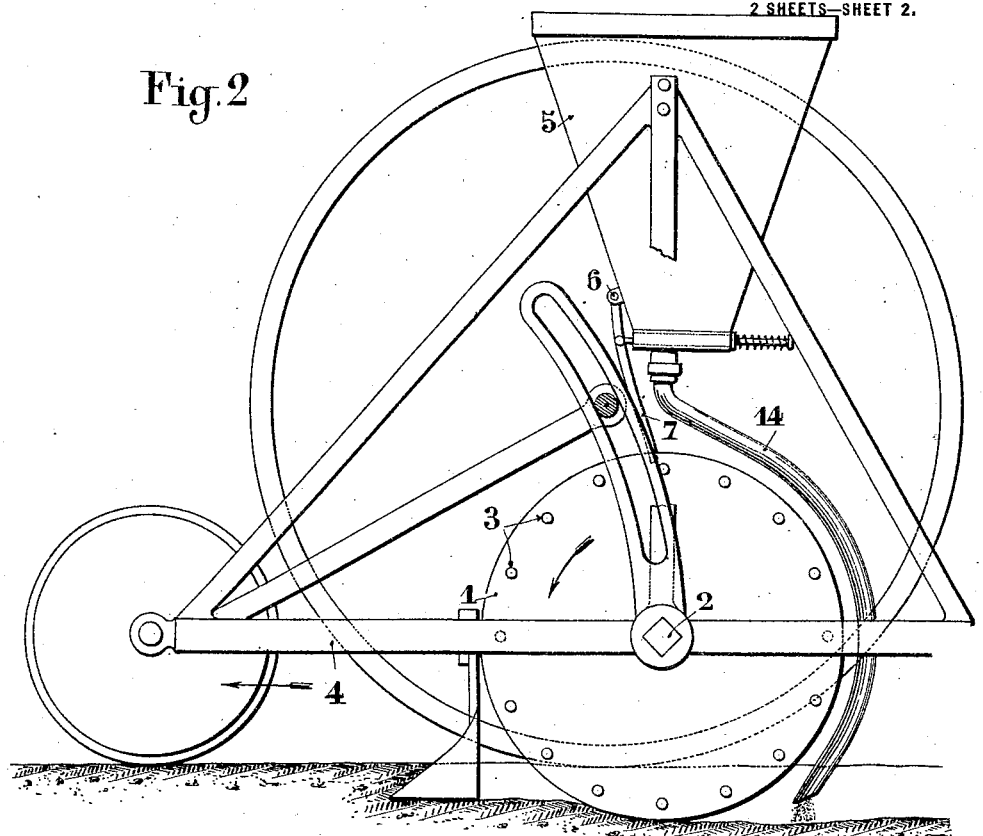

UNITED STATES PATENT OFFICE.

CYPRIEN EDOUARD PAUL JULIEN, OF PARIS, FRANCE.

ROTARY DRILLING OR SOWING MACHINE.

1,304,321.          Specification of Letters Patent.     Patented May 20, 1919.

Application filed December 27, 1917. Serial No. 209,150.

*To all whom it may concern:*

Be it known that I, CYPRIEN EDOUARD PAUL JULIEN, a citizen of the French Republic, and residing in Paris, France, 1 Avenue de l'Observatoire, engineer, have invented certain new and useful Improvements in and Relating to Rotary Drilling or Sowing Machines, of which the following is a complete specification.

This invention relates to a rotary drilling or sowing machine for all kinds of seed or manure, in continuous or discontinuous lines, with rational compression of the seed. It is essentially characterized by a circular rim in the form of a disk or wheel provided with pins, the said wheel rotating, while rolling along the ground, about an axle which supports, by means of a frame, a seed or manure hopper, communicating, by means of a distributer actuated by the pins, with a detachable tube which conveys the seed either to the front or to the back of the rim.

In the accompanying drawing, which represents by way of example one constructional form of the invention:—

Figure 1 is a front elevation of a group of two drills or sowing machines or elements coupled together.

Fig. 2 is a side elevation of Fig. 1, showing the triangular supporting frame carrying at its forward end a draw bar bearing upon a fore-carriage wheel.

Fig. 3 is a longitudinal section on a larger scale of the arrangement for regulating the flow of seed.

Fig. 4 is a cross section thereof, through 4—4 of Fig. 3.

Fig. 5 is a cross section of a modification of Fig. 4.

In Fig. 1 the machine comprises a wheel or disk 1 rolling along the ground and rotating about an axle 2. This disk is provided with pins 3. The axle 2 is fixed to the base of triangle frame 4, which is connected at one base angle with a fore carriage, and which carries the distributing hopper 5, at the top or apex angle (see Fig. 2) and upon which hopper may be located the fulcrum 6 of a lever arm 7 placed so as to oppose the pins 3. The frame 4 is supported by slotted sectors on the axles of the traction wheels. The bottom of the hopper 5 is pierced with an opening 8 in the shape of a truncated cone corresponding to a cavity 9, also in the shape of a truncated cone, formed in a sliding member 10 which is actuated by the rod 11 connected to the lever arm 7, the smaller ends of the two frusto-truncated conical openings 8 and 9 being in contact with one another that is to say, being opposed to one another in such a way as to be reversely inverted. A coil spring 12 serves to return the sliding member. One of the walls of the slide-valve box or casing is pierced with an opening 13 about which is fitted a detachable nozzle 14.

The method of working is as follows:—

The wheel 1, rolling along the ground by being pulled or pushed, in rotating about its axle 2, actuates by means of the pins 3 the lever arms 7 in such a way that the seeds coming from the hopper 5 through the outlet 8 into the frusto-truncated conical cell 9, fall into the aperture 13 of the detachable nozzle 14 which conveys them to the ground either in front of or behind the wheel.

A drilling or sowing machine element forming a complete whole may comprise a disk provided with its hopper carried by the axle of the disk, together with the mechanism for operating the regulating slide valve. Several drill elements may be coupled together, in groups of two elements for instance on the same axle and these groups may be yoked in various numbers to the same draw bar, bearing or not on a fore-carriage.

The sowing wheel may be preceded by a rigid or resilient plow share or colter, opening a furrow as it passes. It may be followed by an implement returning the loose earth over the seed. It may also be provided with an automatic cleaner.

The pins hereinbefore referred to may be detachable, in such a way as to render it possible to vary their number for the purpose of varying at the same time the spacing of the seeds. The lever that operates the regulating device may furthermore be moved away from the pegs, so as to suspend at will the operation of the regulating slide valve.

The plate containing the frusto-truncated conical cell of the regulating slide is of variable thickness according to the seeds and the quantities to be sown. The slide may moreover be double or treble acting, that is to say, it may be provided with several cells permitting of the simultaneous distribution of seeds or manures, the feed being effected by means of several hoppers coupled together.

As plainly shown in Figs. 1 and 2 the frame 4 which carries axle 2 is supported by slotted sectors on the axles of the traction wheels, these sectors being maintained on the axles by means of nuts, so that it is possible by varying the position of the traction wheels due to the slots in the sectors, to vary the weight supported by the wheels 1, and in consequence the compression of the seed in the furrow.

The supporting wheels illustrated in the drawing may be omitted. The pivot 6 of the lever arm 7 may, in some cases, be located on the frame 4.

What I claim is:

1. A rotary seed drilling and sowing machine comprising in combination a frame, an axle supported therein, a circular disk revolubly mounted on said axle, a circular series of pins projecting laterally from said disk adjacent its periphery, a hopper supported in said frame directly over said axle and above the periphery of said disk, distributing means in the lower end of said hopper, means for actuating said distributing means through the aforesaid pins, and a detachable and reversible tube communicating with said distributing means, whereby seed may be conveyed to either the front or rear of the rim of the aforesaid disk.

2. A device as herein characterized including in combination a pair of traction wheels and axles projecting inwardly therefrom, slotted sectors adjustably supported on said axles, another axle supported at the lower ends of said sectors, disks revolubly mounted on the last mentioned axles, triangular frames supported at their base on said axle, seed hoppers supported at the apex of said triangular frames in vertical alinement with the axle last mentioned, and means actuated by the revolution of the disk to successively feed seed from the hoppers to the front or rear of said disk.

In testimony whereof I have hereunto set my hand, at Paris, (France), this 30th day of November, 1917.

CYPRIEN EDOUARD PAUL JULIEN.

In the presence of—
CHAS. P. PRESSLY.

Copies of this patent may be obtained for five cents each, by addressing the "Commissioner of Patents, Washington, D. C."